(12) United States Patent
Stone et al.

(10) Patent No.: US 8,720,374 B2
(45) Date of Patent: *May 13, 2014

(54) LIQUID BIRD FEEDER

(75) Inventors: John Stone, Southboro, MA (US);
Oliver McLachlan, Boston, MA (US);
David Harting, Needham, MA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,692

(22) Filed: Jan. 20, 2012

(65) Prior Publication Data

US 2012/0152174 A1 Jun. 21, 2012

Related U.S. Application Data

(63) Continuation of application No. 12/929,777, filed on Feb. 15, 2011, now Pat. No. 8,100,085, which is a continuation of application No. 12/588,262, filed on Oct. 8, 2009, now Pat. No. 7,891,319, which is a continuation of application No. 11/434,020, filed on May 15, 2006, now Pat. No. 7,600,487.

(60) Provisional application No. 60/681,376, filed on May 16, 2005.

(51) Int. Cl.
*A01K 7/00* (2006.01)
*A01K 7/06* (2006.01)

(52) U.S. Cl.
USPC .............................................. 119/72; 119/77

(58) Field of Classification Search
USPC .......... 119/52.2, 57.8, 57.9, 51.01, 72, 74, 77
See application file for complete search history.

(56) References Cited

U.S. PATENT DOCUMENTS

| | | | |
|---|---|---|---|
| 516,600 A | 3/1894 | Higgins | |
| 516,637 A | 3/1894 | Higgins | |
| 645,680 A | 3/1900 | Chapman | |
| 1,627,140 A | 5/1927 | Bindemann | |
| 1,828,048 A | 10/1931 | Williams | |
| 2,687,115 A | 8/1954 | Andrews | |
| 3,780,703 A | 12/1973 | Boehland, Jr. | |
| 4,977,859 A | 12/1990 | Kilham | |
| 5,062,388 A | 11/1991 | Kilham | |
| 5,123,574 A | 6/1992 | Poulos | |
| 5,247,904 A | 9/1993 | Anderson | |
| 5,303,674 A * | 4/1994 | Hyde, Jr. .......................... | 119/77 |
| 5,423,291 A | 6/1995 | Daugherty | |
| 5,454,348 A | 10/1995 | Colwell et al. | |
| 5,507,249 A | 4/1996 | Shaw | |
| 5,924,382 A | 7/1999 | Shumaker | |
| 6,079,361 A * | 6/2000 | Bowell et al. .................... | 119/72 |
| 6,257,288 B1 | 7/2001 | Davidian et al. | |
| 6,543,384 B2 | 4/2003 | Cote | |
| 6,739,284 B1 | 5/2004 | Olive | |
| D495,099 S * | 8/2004 | Fort, II .......................... | D30/123 |
| 7,000,566 B2 * | 2/2006 | Fort, II .......................... | 119/69.5 |
| 7,040,251 B2 | 5/2006 | Fort, II | |

(Continued)

*Primary Examiner* — Timothy D Collins
*Assistant Examiner* — Brian M O'Hara
(74) *Attorney, Agent, or Firm* — Jacobson Holman PLLC

(57) ABSTRACT

A liquid hummingbird feeder is provided with a liquid container having a sealable top opening and a bottom opening, a liquid tray adapted to immerse the bottom opening in liquid, and a valve mechanism adapted to close the bottom opening to enable the liquid container to be filled through the sealable top opening.

18 Claims, 4 Drawing Sheets

(56) References Cited

U.S. PATENT DOCUMENTS

| | | |
|---|---|---|
| 7,146,930 B1 | 12/2006 | Ness |
| 7,201,115 B2 | 4/2007 | Willinger et al. |
| 7,234,418 B2 | 6/2007 | Fort et al. |
| 7,685,969 B2 | 3/2010 | Stone et al. |
| 2005/0028743 A1 | 2/2005 | Wechsler |
| 2007/0277738 A1 | 12/2007 | Dentsbier |

* cited by examiner

LIQUID BIRD FEEDER

This application is a continuation application of U.S. Ser. No. 12/929,777, filed Feb. 15, 2011, issuing as U.S. Pat. No. 8,100,085 on Jan. 24, 2012, which was a continuation of U.S. Ser. No. 12/588,262 filed Oct. 8, 2009, which issued as U.S. Pat. No. 7,891,319 on Feb. 22, 2011, which was a continuation application of U.S. Ser. No. 11/434,020 filed May 15, 2006, which issued as U.S. Pat. No. 7,600,487 on Oct. 13, 2009, which claimed priority from U.S. provisional application, Ser. No. 60/681,376 filed May 16, 2005, the priority of which is hereby claimed.

BACKGROUND OF THE INVENTION

1. Field of the Invention

The present invention is generally related to liquid bird feeders and, in particular, to such bird feeders which may be filled without inversion.

2. Description of the Prior Art

Liquid nectar bird feeders are used for specifically attracting hummingbirds in the same manner as seed feeders are used to attract other birds. Some may consider liquid nectar feeders to be less convenient however, because of the liquid auto-feed structure. Filling liquid feeders commonly requires inversion of the feeder and certain liquid spillage from this action.

It is therefore desirable to have a liquid nectar feeder which minimizes liquid spillage during filling and which even avoids inversion during filling.

SUMMARY OF THE INVENTION

In one embodiment of the present invention, a liquid bird feeder, comprises a liquid container having a sealable top opening and a bottom opening, a liquid tray adapted to immerse the bottom opening in liquid, and a valve mechanism adapted to close the bottom opening to enable the liquid container to be filled through the sealable top opening.

The liquid container may include a vertically oriented cylindrical extension forming the bottom opening. The liquid tray may include a vertically oriented cylindrical collar adapted to connect to the cylindrical extension of the liquid container. The cylindrical collar may include a cylindrical side wall having a liquid port located therein. The valve mechanism may include a rotatable cylindrical member having an opening adapted to selectively align and misalign with the port in the cylindrical collar to respectively open or close the port with rotation of the rotatable cylindrical member. The cylindrical collar may include a plurality of ports and the rotatable cylindrical member may include a corresponding plurality of openings adapted to simultaneously align or misalign with the plurality of ports for respectively opening and closing all of the plurality of ports simultaneously with rotation of the rotatable cylindrical member.

The rotatable cylindrical member may be adapted to be at least partially immersed in liquid within the liquid tray and may include an actuator which extends above the port in the cylindrical collar, and thus above a normal liquid level in the liquid tray. The liquid tray may include a tray cover having one or more feeding ports passing there through and a slot adapted to allow the actuator to be operable from outside of the tray cover to rotate the rotatable cylindrical member.

The liquid container may include a top cover adapted to seal the top opening.

BRIEF DESCRIPTION OF THE DRAWINGS

The present invention is illustratively shown and described in reference to the accompanying drawings, in which.

DETAILED DESCRIPTION OF THE PREFERRED EMBODIMENTS

Figure 1:
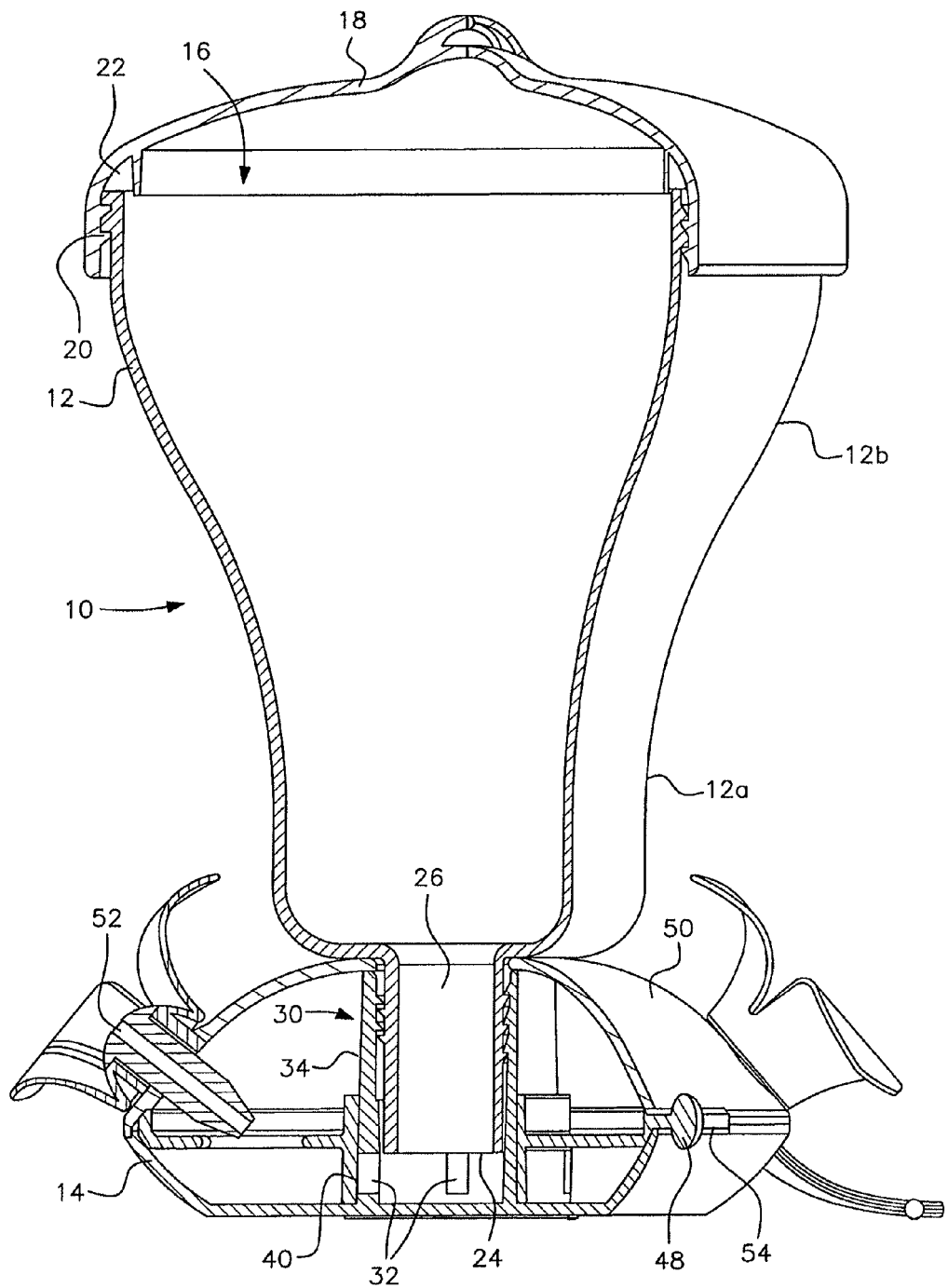
FIG. 1 is a sectional side view of a bird feeder constructed in accordance with one embodiment of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 generally shows a sectional side view of a bird feeder 10, which generally includes a reservoir or liquid container 12 and a liquid tray 14. Liquid container 12 includes a sealable top opening 16 having a cover 18 adapted to seal top opening 16. Cover 18 includes peripheral threads 20 adapted to engage liquid container 12 and an 0-ring seal 22 located to create an air tight seal.

Figure 2:
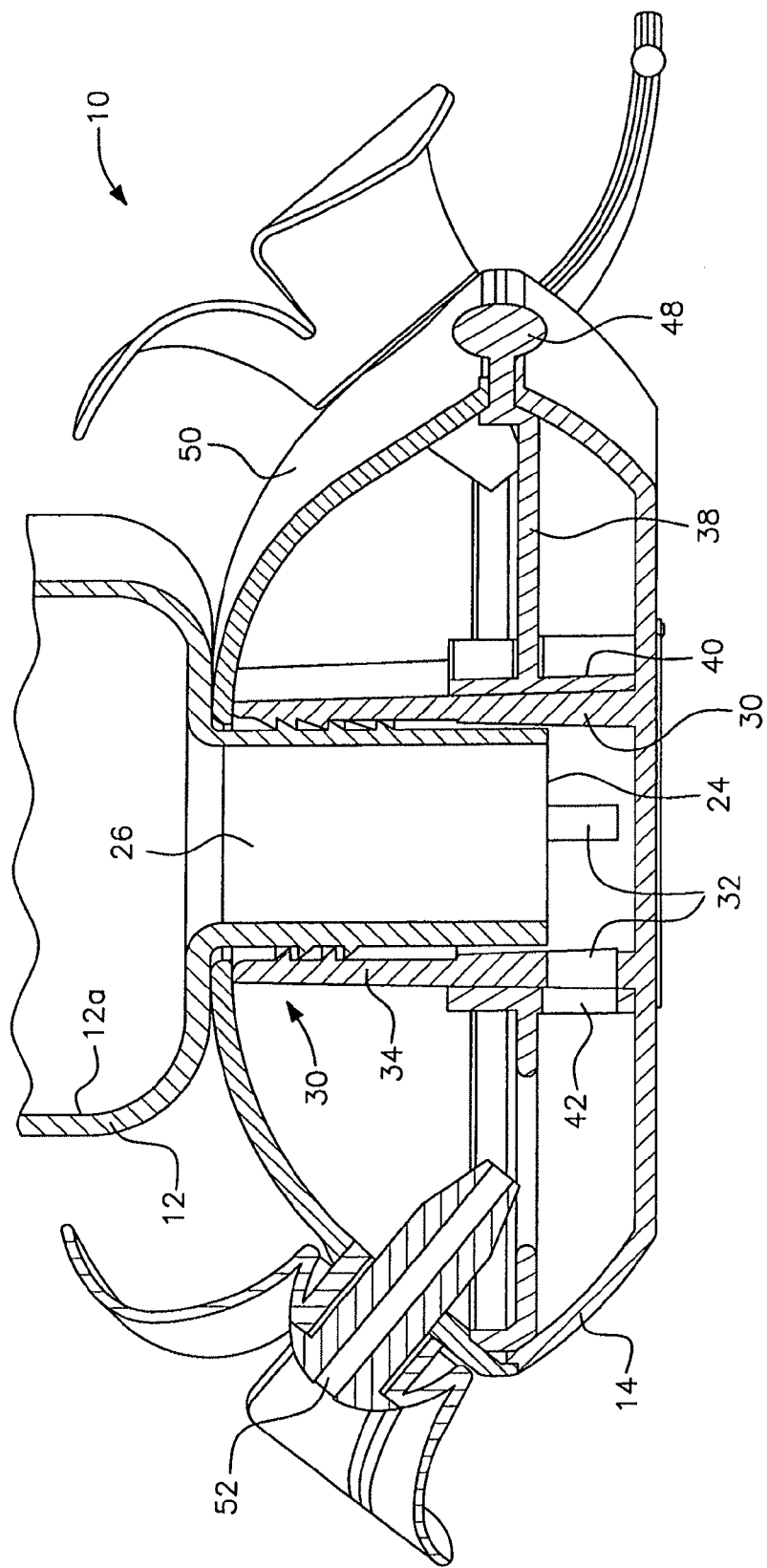
FIG. 2 is an enlarged, partial sectional, side view of the embodiment of FIG. 1, showing greater detail and having a component is located in a different operative position from the view of FIG. 1.

FIG. 2 shows an enlarged sectional side view of the lower portion of bird feeder 10. Liquid container 12 also includes a bottom opening 24 formed by a cylindrical extension 26 of the lower end 12a of liquid container 12. Bottom opening 24 and liquid tray 14 are oriented to immerse bottom opening 24 in liquid from liquid container 12. This arrangement allows a vacuum created in the upper end 12b of the liquid container 12 to retain liquid therein and automatically feed liquid into liquid tray 14 to the level of bottom opening 24.

Liquid tray 14 includes a vertically oriented, cylindrical collar 30, which extends upwardly and is adapted to engage cylindrical extension 26 of liquid container 12. Cylindrical collar 30 is axially closed at its lower end by formation with liquid tray 14, but includes one or more ports 32 formed in the cylindrical side wall 34.

Bird feeder 10 further includes a valve mechanism 38 including a rotatable cylindrical member 40. Cylindrical member 40 includes one or more openings 42 adapted to either align with a port 32 or misalign in response to the rotation of valve mechanism 38 and rotatable cylindrical member 40. FIG. 2 shows opening 42 in alignment with a port 32 covered by a portion of rotatable cylindrical member 40, thus effecting closure of ports 32.

Figure 3:
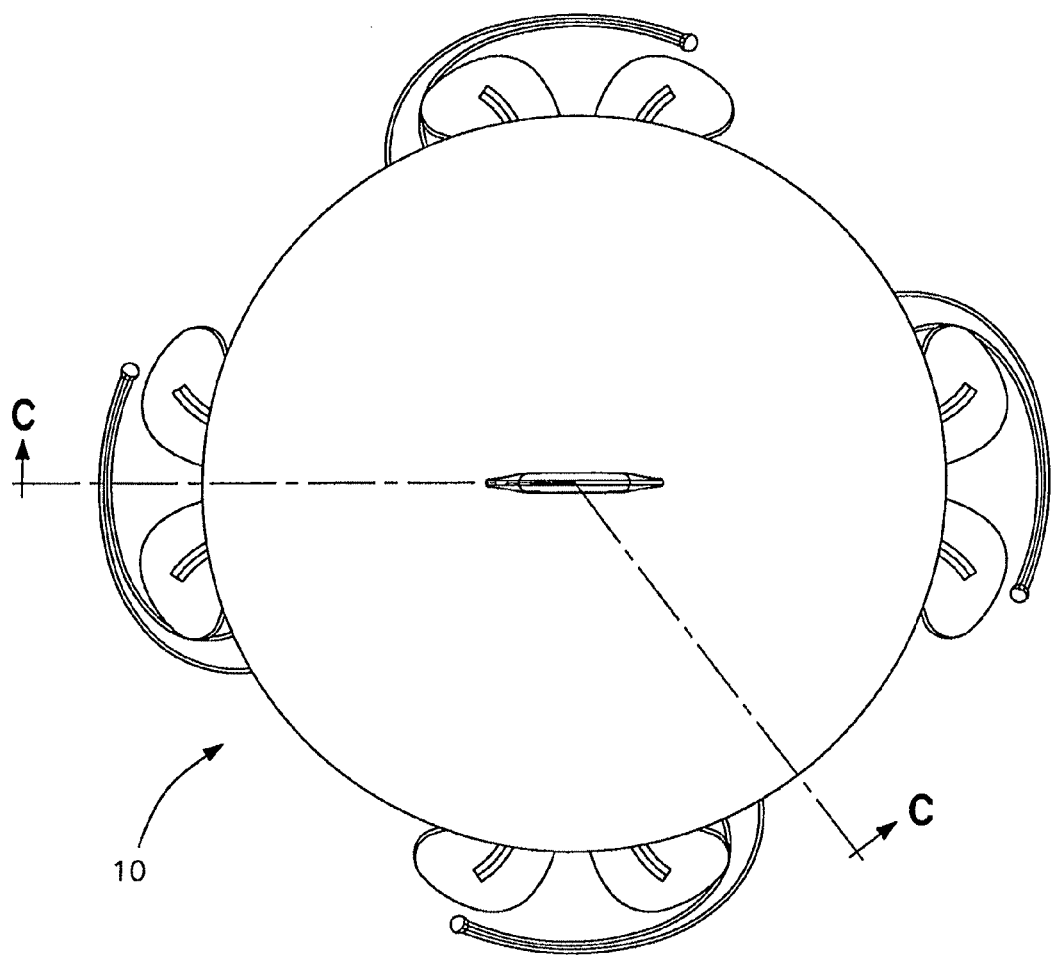
FIG. 3 is a top view of the bird feeder of FIGS. 1 and 2 showing approximate cross sectional cut lines used for FIGS. 1 and 2.

FIG. 3 shows the approximate cross section used for FIGS. 1 and 2. However, the angled leg of the cross section line C-C is slightly different between FIGS. 1 and 2, because the cross section passes through actuator handle 48, which is in different positions in FIGS. 1 and 2.

Figure 4:
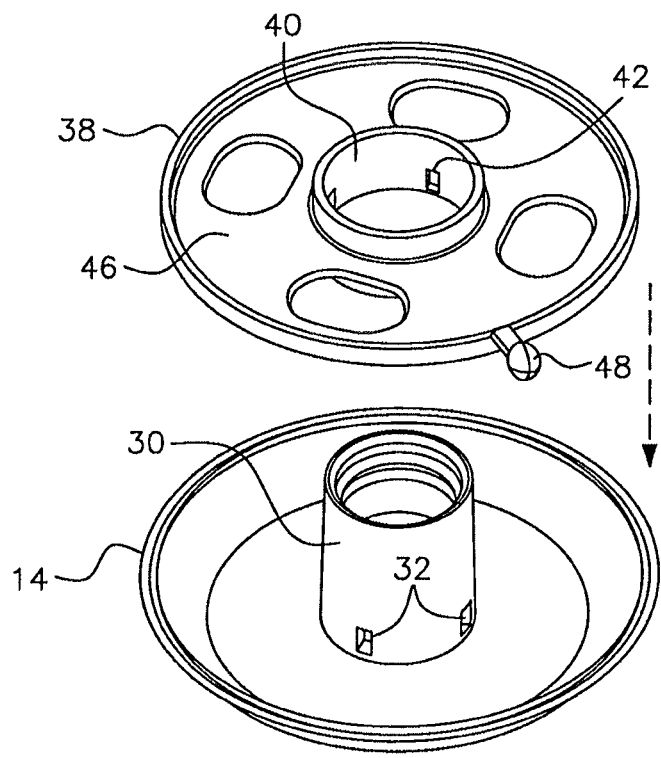
FIG. 4 is a perspective view of two components used in the bird feeder of FIGS. 1-3.
Figure 5:
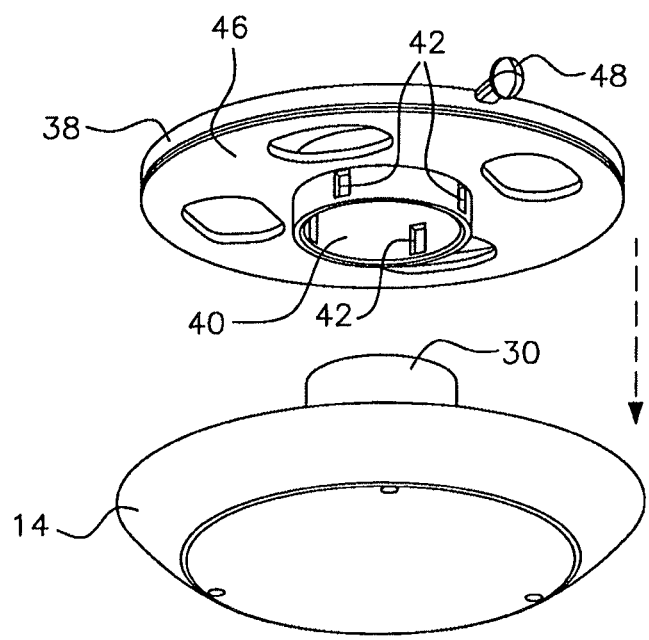
FIG. 5 is a different perspective view of the bird feeder components of FIG. 4.

FIGS. 4 and 5 show respective upper and lower perspective views of the liquid tray 14 and valve mechanism 38. FIG. 4 shows cylindrical collar 30 to have a plurality of ports 32, and FIG. 5 shows rotatable cylindrical member 40 to have a plurality of openings 42. Ports 32 and openings 42 are located at the same angular positions around the their respective cylindrical axes to cause simultaneous misalignment or alignment between all ports 32 and openings 42, thus allowing bottom opening 24 to be selectively closed or opened. Valve mechanism 38 further includes a circular disk 46 and an actuator handle 48, which are shown to extend above the level of port 32 in FIGS. 1 and 2. This enables activation of valve mechanism 38 even while there is liquid present in liquid tray.

Now returning to FIGS. 1 and 2, liquid tray 14 further includes a cover 50 adapted to substantially close liquid tray 14 and limit access to any liquid contents thereof. Cover 50 includes a plurality of bird feeder ports 52 adapted to allow access by long-beaked hummingbirds while simultaneously preventing access by bees. Cover 50 further includes a slot 54 to allow the actuator handle 48 to extend outside of liquid tray 14.

The unique construction of bird feeder 10 thus allows filling thereof without necessitating inversion and undesired dripping or spillage of liquid nectar.

It is now apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A top-fill liquid hummingbird feeder for providing liquid nectar to hummingbirds, comprising:
    a liquid container configured to contain a volume of liquid nectar and having a top opening and a bottom portion with a downwardly oriented extension having an extension flow opening;
    a cap adapted to close said top opening and to be removed to allow filling through said top opening;
    a liquid tray configured to receive liquid nectar via said extension flow opening from said container, said liquid tray including at least one feeding port through which hummingbirds can access the liquid nectar in said tray;
    an attaching element positioned centrally in said tray and extending upwardly therefrom, said attaching element being engaged with said extension to secure the container to the tray; and
    a valve mechanism associated with said attaching element and including a movable member, said movable member being a separate element from said attaching element and movable with respect thereto, at least part of said movable member fitting over and encircling said attaching element, said movable member configured, through movement thereof, to selectively open and close said extension flow opening through which liquid in said container flows into said liquid tray, closure of said flow opening by said valve mechanism enabling said liquid container to be filled by removing said cap and adding liquid nectar through said top opening while, at the same time, preventing overflow of nectar through said feeding port.

2. The hummingbird feeder of claim 1, wherein said movable member selectively opens or closes said flow opening to respectively allow or prevent flow of liquid from said container bottom portion through said extension flow opening into said liquid tray when said movable member moves between a first position and a second position.

3. The hummingbird feeder of claim 1, wherein at least a portion of said attaching element includes inner threads adapted to screw-threadedly engage with external threads on the bottom portion of said extension to secure the container to the liquid tray.

4. The hummingbird feeder of claim 3, wherein said attaching element is fixedly connected to said liquid tray.

5. The hummingbird bird feeder of claim 1, wherein said liquid tray includes a tray cover configured to substantially close said liquid tray, said feeding port passing through said cover with a narrow elongated passageway that is sized to allow access by long-beaked hummingbirds while preventing access by bees, liquid in said liquid tray being accessible to hummingbirds only through said feeding port when said feeder is in use.

6. The hummingbird feeder of claim 1, wherein said movable member is configured to be at least partially immersed in liquid within said liquid tray and includes a part which extends above a liquid level in said liquid tray when said liquid tray is full.

7. The hummingbird feeder of claim 1, wherein said extension is bottleneck-shaped and said attaching element includes a generally cylindrical vertically upstanding wall integral with said liquid tray and adapted to receive said extension of said liquid container.

8. The hummingbird feeder of claim 7, wherein said vertically upstanding wall includes parts that engage opposing sides of said extension.

9. The hummingbird feeder of claim 8, wherein at least a portion of said attaching element includes inner threads adapted to screw-threadedly engage with external threads on the extension of said liquid container to secure the container to the liquid tray.

10. The hummingbird feeder of claim 1, wherein said movable member has a curved inner surface that rides along a correspondingly curved outer surface of said attaching element when said movable member moves.

11. The hummingbird feeder of claim 10, wherein sideways movement of said movable member is constrained by contact with said attaching element.

12. A top-fill liquid hummingbird feeder, comprising:
    a liquid container having a top opening for receiving hummingbird nectar and a lower end with a downwardly oriented, narrowed extension having a bottom flow opening for dispensing nectar;
    a container cover adapted to engage said liquid container to close said top opening;
    a covered liquid tray defining an enclosure accessible by at least one feeding port, said feeding port passing through an upper part of said covered tray with a narrow elongated passageway that is sized to allow access by long-beaked hummingbirds while preventing access by bees, liquid in said covered liquid tray being accessible to hummingbirds only through said feeding port when said feeder is in use;
    an attaching element secured to said tray and having an upwardly directed opening, said attaching element being complementary in shape with said downwardly oriented extension with said extension being received within said opening when said container is connected to said covered liquid tray;
    a valve mechanism having a movable member configured to regulate flow of hummingbird nectar from said container through said bottom flow opening in said extension and into said liquid tray, said movable member being a separate element from said attaching element and movable with respect thereto, said movable member opening or closing said flow opening to respectively allow or prevent flow of liquid from said container into said liquid tray when said movable member moves between a first position and a second position, at least part of said movable member fitting over and encircling said attaching element; and said container, tray and valve mechanism being configured so that, when said bottom opening is closed, said liquid container can be filled with nectar through said top opening while, at the same time, overflow of nectar through said feeding port is prevented.

13. The hummingbird feeder of claim 12, wherein said narrowed extension is bottleneck-shaped and said attaching element includes a generally cylindrically vertically upstanding structure integral with said liquid tray and adapted to receive said downwardly oriented bottleneck-shaped extension of said liquid container.

14. The hummingbird feeder of claim 13, wherein said vertically upstanding structure includes parts that engage opposing sides of said bottleneck extension.

15. The hummingbird feeder of claim 12, wherein said movable member is adapted to be at least partially immersed in liquid within said liquid tray and includes a part which extends above a liquid level in said liquid tray when said liquid tray is full.

16. The hummingbird feeder of claim 12, wherein said valve is operatively associated with said attaching element and movable with respect thereto when opening and closing said bottom opening.

17. The hummingbird feeder of claim 12, wherein said movable member has a curved inner surface that rides along a correspondingly curved outer surface of said attaching element when said movable member moves.

18. The hummingbird feeder of claim 17, wherein sideways movement of said movable member is constrained by contact with said attaching element.

* * * * *